Aug. 22, 1961 V. G. MAY 2,997,335
AUTOMOTIVE FOLDING SEAT
Filed June 1, 1959 2 Sheets-Sheet 1
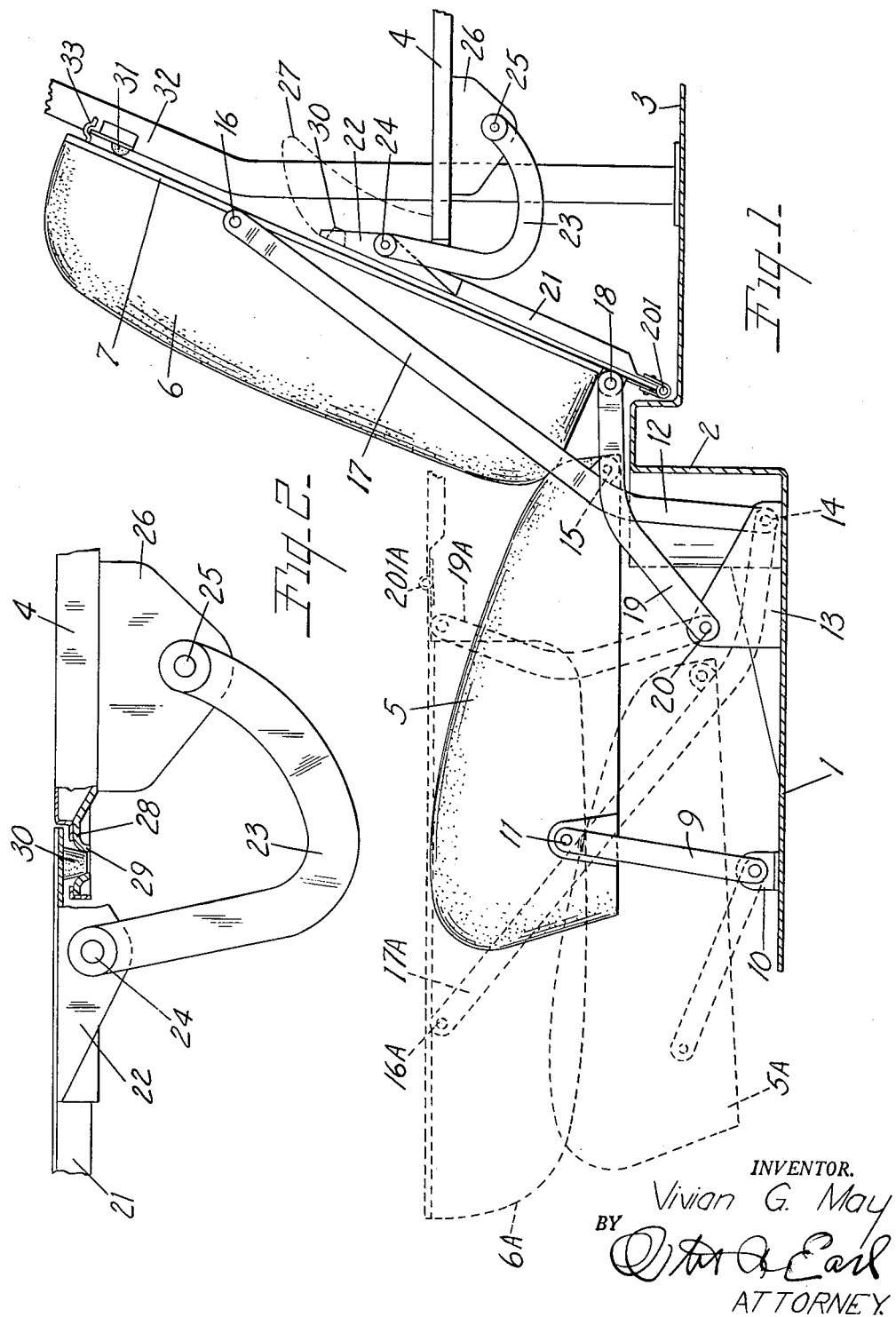
INVENTOR.
Vivian G. May
BY
ATTORNEY.

Aug. 22, 1961 V. G. MAY 2,997,335
AUTOMOTIVE FOLDING SEAT
Filed June 1, 1959 2 Sheets-Sheet 2
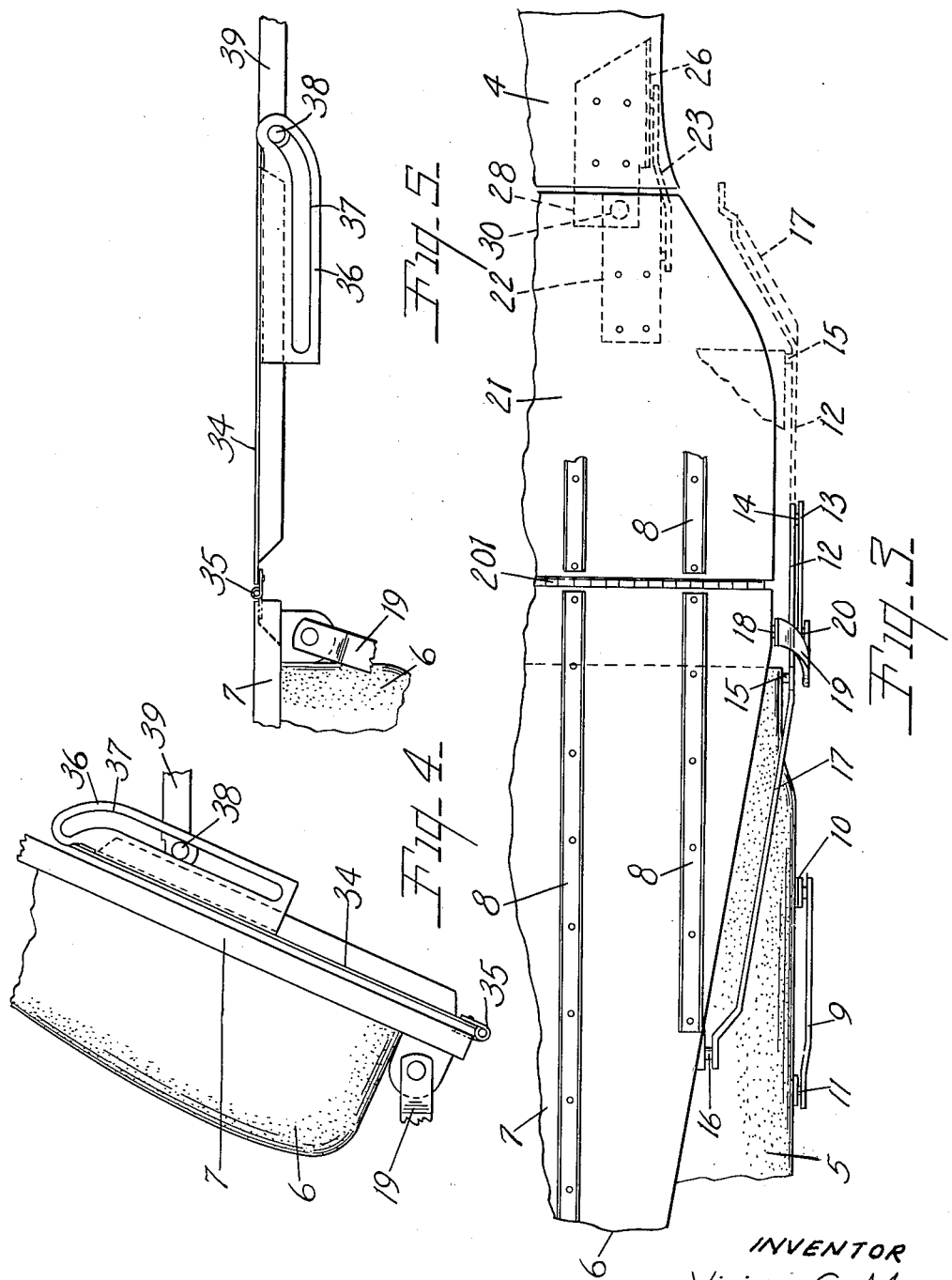
INVENTOR
Vivian G. May
BY
ATTORNEY.

2,997,335
Patented Aug. 22, 1961

2,997,335
AUTOMOTIVE FOLDING SEAT
Vivian G. May, Richland, Mich., assignor to Checker Motors Corporation, Kalamazoo, Mich.
Filed June 1, 1959, Ser. No. 817,385
14 Claims. (Cl. 296—66)

This invention relates to improvements in automotive folding seat. The principal objects of this invention are:

First, to provide folding seat for the type of automobile known as a station wagon which seat will collapse to extend the rear deck of the vehicle substantially more than the height of the back of the back cushion of the seat.

Second, to provide a collapsible rear seat for station wagons in which both the seat cushion and the back cushion are folded simultaneously forwardly and downwardly to bring the back of the back cushion into substantially the plane of a fixed rear deck in the vehicle and to simultaneously fold up and interlock an auxiliary deck panel between the forward edge of the permanent deck and the lower or rear edge of the back cushion to form a continuous elongated cargo deck in the vehicle.

Third, to provide operating and controlling links and levers for the seat cushion and back cushions of a foldable seat which will apply forwardly directed tension between the back of the back cushion and an auxiliary deck panel hinged to the bottom of the back cushion and releasably interlocking with a permanent deck panel so that a load applied to the back of the back cushion in collapsed folded position will hold the auxiliary deck panel in tight non-rattling position.

Fourth, to provide a collapsible seat with a forwardly and downwardly swinging back cushion having an auxiliary panel foldably hinged in closing relation to the back of the back cushion and having means for controlling and directing the movement of the swinging edge of the auxiliary panel so that the auxiliary panel automatically folds into interlocked continuing position between a rear fixed deck and the forwardly collapsed position of the back cushion.

Other objects and advantages of the invention will be apparent from a consideration of the following description and claims. The drawings of which there are two sheets show a preferred form of the collapsible seat structure and one modified form of structure for controlling and directing the swinging motion of the auxiliary deck panel.

FIG. 1 is a fragmentary side elevational view of the seat in erected position with portions of the vehicle in which the seat is mounted conventionally illustrated and shown partially in cross section.

FIG. 2 is a fragmentary enlarged side elevational view partially broken away in section and illustrating the extended operative position assumed by the auxiliary deck panel in the collapsed position of the seat.

FIG. 3 is a fragmentary plan view of the seat and deck structure shown in FIG. 1 with the seat in collapsed position and the deck in extended load supporting position.

FIG. 4 is a fragmentary side elevational view of a modified form of connection between the auxiliary deck panel and the permanent deck of the vehicle with the back cushion in erected position.

FIG. 5 is a fragmentary side elevational view of the structure shown in FIG. 4 in the load supporting position thereof which is assumed when the seat is collapsed.

In FIG. 1 the reference numeral 1 conventionally illustrates the floor panel of an automotive vehicle and the raised rectangular portion 2 thereof conventionally illustrates the raised housing which provides clearance for the rear axle and differential of the vehicle as is common. Numeral 3 indicates a portion of the floor of the rear compartment of the vehicle and 4 indicates the fixed rear deck which is commonly found in the rear of station wagons. It is generally old in station wagon construction to provide a rear seat which will collapse in some way to extend the rear deck 4 and provide additional cargo space when desired.

The present invention provides a collapsible seat consisting of the seat cushion 5 and the back cushion 6. The details of the framing, springs and upholstery of these cushions are unimportant to the present invention but it should be noted that the back cushion 6 has a deck extension panel 7 on its rear side which is substantially co-extensive with the back of the back cushion and adapted as shown in FIG. 3 by the addition of wear strips 8 to support cargo. The seat cushion 5 is supported at its ends and near its forward edge by links 9 that are pivoted to brackets 10 on the floor and pivoted to the seat cushion at 11. The rear edge of the seat cushion 5 is supported at its ends by links 12 pivoted to the bracket 13 at 14 and pivoted to the rear edge of the seat cushion at 15. The four links or levers 9 and 12 support the seat cushion in the erected position shown in full lines in FIG. 1 and are swingable forwardly to move the seat cushion forwardly and downwardly to the collapsed position shown by dotted lines at 5A in FIG. 1 and shown in full lines in plan view in FIG. 3.

The back cushion 6 and more particularly the extension deck panel 7 on the back side thereof is vertically supported by pivots 16 located at each end of the cushion and substantially above the lower edge thereof. The pivots 16 are engaged and supported by upwardly and rearwardly angled extension arms 17 formed on the upper ends of the previously described links 12 that support the rear edge of the seat cushion. Thus as the seat cushion and lever arms 12 move forwardly and downwardly the extension arms 17 and the upper edge of the back cushion are swung forwardly and downwardly to the dotted position shown at 6A, 16A and 17A in FIG. 1. The lower edge of the back cushion and deck extension panel are supported and guided by pivots 18 which connect to angled links 19 at each end of the seat. The links 19 are fixedly pivoted at 20 to the brackets 13 and necessarily swing with the links 12 when the back cushion is collapsed forwardly. With reference to the collapsed or forwardly folded position of the links 19 to the dotted position shown at 19A in FIG. 1 it will be noted that these links in their upright position support the rear edge of the extension panel at approximately the level of the rear deck 4.

Secured to the lower rear edge of the extension deck panel 7 is one leaf of a hinge 201 and the other leaf of this hinge is connected to the lower or forward edge of the auxiliary deck panel 21. In the erected position of the seat this auxiliary panel assumes folded generally upright position along the back of the extension panel 7. As the back cushion is tilted forwardly the hinge 201 and the forward edge of the auxiliary panel swing upwardly and forwardly to the position shown by dotted lines at 201A in FIG. 1. The upper or rear edge of the auxiliary panel 21 carries brackets 22 on each end to which the C-shaped guide links 23 are pivotally connected as at 24. The lower rear ends of the links 23 are secured to the fixed pivots 25 carried by brackets 26 secured to the underside of the fixed deck panel 4 or other fixed part of the vehicle body. These links 23 control and guide the swinging motion of the upper edge of the auxiliary panel 21 in the path illustrated by the dot-dash line at 27 in FIG. 1.

The forward edge of the fixed deck panel 4 has one or more forwardly projecting supports 28 thereon which vertically engage and support the rear edge of the auxiliary panel as the seat is collapsed forwardly. Desirably, the support 28 has a socket 29 formed therein which receives and horizontally interlocks with a stud 30 depending from the underside of the rear edge of the auxiliary panel 21. Desirably, the stud 30 is of rubber or other sound deadening material.

In the erected position of the seat the upper portion of the back of the back cushions rests against a bumper 31 carried by a fixed part of the vehicle body such as the side column 32 and a releasable spring catch 33 is provided for preventing accidental forward tilting of the back cushion as the result of sudden stops of the vehicle. It will be noted that in the collapsed forward position of the back cushion 6, the extension arms 17 are inclined downwardly and rearwardly to the pivots 14 so that any weight applied to the extension panel 7 tends to swing the pivot 16A downwardly and forwardly which motion immediately applies tension through the hinge 201 to the interlocking stud 30. Thus the weight of the parts of the seat and any load carried thereby holds the pivoted connections tightly in engagement and prevents rattling. That portion of overlap between the collapsed position of the seat cushion 5A and back cushion 6A in FIG. 1 is accommodated by natural cushioning collapse of both cushions.

In the modified form of the structure shown in FIGS. 4 and 5 the back cushion 6, extension panel 7 and link 19 are the same as in the first form of the invention but the auxiliary deck panel 34 connected to the lower edge of the extension panel by a hinge 35 has side plates 36 secured to the upper part of its under side and the plates 36 define arcuate slots 37 which receive and are guided by fixed pins or studs 38 projecting from the sides of the forward edge of the rear deck panel 39. The slotted plates 36 and studs 38 guide the free swinging edge of the auxiliary deck panel 34 in much the same manner as the swinging links 23 in the first form of the invention. As in the first form of the seat structure, any tendency of the deck extension panel 7 to move downwardly under load creates tension in the auxiliary panel 34 and holds the end of the slot 37 firmly against the stud 38.

What is claimed as new is:

1. A folding seat structure in a vehicle having a floor and a deck positioned in elevated position behind said floor comprising a seat cushion, a back cushion, first links pivoted on said floor and swingable in vertical longitudinal planes at each side of said vehicle, said first links being connected to the ends of said seat cushion adjacent the front edge thereof to support the front of the seat cushion in elevated erected position when the links are upright, second links pivoted on said floor behind said first links and having pivotal connections to the ends of said seat cushion adjacent the rear edge thereof to support the rear edge of the seat cushion in elevated position in the upright position of said second links, rearwardly angled arms on the ends of said second links connected to the ends of said back cushion above the vertical center thereof and adjacent the back surface thereof to support the top of the back cushion above and behind the erected position of said seat cushion, third links pivoted on said floor by brackets raising their pivots above the pivotal connections at the lower ends of said second links and located ahead of said second links, said third links being swingable in vertical longitudinal planes of said vehicle and being connected at their swinging ends to the ends of said back cushion at the lower edge thereof and adjacent the back surface thereof, the length of said third links being such as to support the back surface of said back cushion at the level of said deck in the forwardly rotated and upright positions of said third links, a deck extension panel on the back of said back cushion, a filler deck panel hinged at its lower edge to the lower edge of said extension panel and in facing relation thereto in the erected position of said back cushion, brackets secured to the underside of said deck at each side thereof, fixed pivots on said last brackets located below and rearwardly of the forward edge of said deck, fourth links of upwardly concave shape connected at their rear ends to said fixed pivots to swing upwardly around the forward edge of said deck and pivotally connected at their swinging ends to the underside of said filler deck panel adjacent the upper rear edge thereof, a fixed support on the forward edge of said deck engageable with the rear edge of said filler deck panel in the downwardly folded position of the filler deck panel, coacting stud and socket means having cushioning surfaces and interlockingly engageable longitudinally of the vehicle between a fixed point on said deck of said vehicle and said filler deck panel when said panel is horizontal, a stop on a fixed part of said vehicle longitudinally supporting the upper portion of the back of said back cushion in the erected position of said back cushion, and a releasable catch holding said back cushion against said stop.

2. A folding seat structure in a vehicle having a floor and a deck positioned in elevated position behind said floor comprising a seat cushion, a back cushion, first links pivoted on said floor and swingable in vertical longitudinal planes at each side of said vehicle, said first links being connected to the ends of said seat cushion adjacent the front edge thereof to support the front of the seat cushion in elevated erected position when the links are upright, second links pivoted on said floor behind said first links and having pivotal connections to the ends of said seat cushion adjacent the rear edge thereof to support the rear edge of the seat cushion in elevated position in the upright position of said second links, rearwardly angled arms on the ends of said second links connected to the ends of said back cushion above the vertical center thereof to support the top of the back cushion above and behind the erected position of said seat cushion, third links pivoted on said floor by pivots located ahead of said second links, said third links being swingable in vertical longitudinal planes of said vehicle and being connected at their swinging ends to the ends of said back cushion at the lower edge thereof, the length of said third links being such as to support the back surface of said back cushion at the level of said deck in the forwardly rotated and upright positions of said third links, a deck extension panel on the back of said back cushion, a filler deck panel hinged at its lower edge to the lower edge of said extension panel and in facing relation thereto in the erected position of said back cushion, fixed pivots located below and rearwardly of the forward edge of said deck, fourth links of upwardly concave shape connected at their rear ends to said fixed pivots to swing upwardly around the forward edge of said deck and pivotally connected at their swinging ends to the underside of said filler deck panel adjacent the upper rear edge thereof, a fixed support on the forward edge of said deck engageable with the rear edge of said filler deck panel in the downwardly folded position of the filler deck panel, coacting stud and socket means having cushioning surfaces and interlockingly engageable longitudinally of the vehicle between a fixed point on said vehicle and said filler deck panel when said panel is horizontal, a stop on a fixed part of said vehicle longitudinally supporting the upper portion of the back of said back cushion in the erected position of said back cushion, and a releasable catch holding said back cushion against said stop.

3. A folding seat structure in a vehicle having a floor and a deck positioned in elevated position behind said floor comprising a seat cushion, a back cushion, first links pivoted on said floor and swingable in vertical longitudinal planes at each side of said vehicle, said first links being connected to the ends of said seat cushion adjacent the front edge thereof to support the front of the seat cushion in elevated erected position when the links are upright, second links pivoted on said floor behind said first links and having pivotal connections to the ends of said seat cushion adjacent the rear edge thereof to support the rear edge of the seat cushion in elevated position in the upright position of said second links, upwardly extended arms on the ends of said second links connected to the ends of said back cushion substantially above the bottom thereof to support the top of the back cushion above and behind the erected position of said seat cushion, third links pivoted on said floor, said third links being swingable in vertical longitudinal planes of said vehicle and being connected at their swinging ends to the ends of said back cushion at the lower edge thereof, the length of said third links being such as to support the back surface of said back cushion at the level of said deck in the forwardly rotated and upright positions of said third links, a deck extension panel on the back of said back cushion, a filler deck panel hinged at its lower edge to the lower edge of said extension panel and in facing relation thereto in the erected position of said back cushion, fixed pivots located rearwardly of the edge of said deck, fourth links connected at their rear ends to said fixed pivots and pivotally connected at their swinging ends to said filler deck panel adjacent the upper rear edge thereof, a fixed support on the forward edge of said deck engageable with the rear edge of said filler deck panel, in the downwardly folded position of the filler deck panel, coacting stud and socket means having cushioning surfaces and interlockingly engageable longitudinally of the vehicle between a fixed point on said vehicle and said filler deck panel when said panel is horizontal, and a stop on a fixed part of said vehicle longitudinally supporting the upper portion of the back of said back cushion in the erected position of said back cushion.

4. A folding seat structure in a vehicle having a floor and a support positioned in elevated position behind said floor comprising a seat cushion, a back cushion, first links pivoted on said floor and swingable in vertical planes at each side of said seat, said first links being connected to the ends of said seat cushion adjacent the front edge thereof to support the front of the seat cushion in elevated erected position when the links are upright, second links pivoted on said floor behind said first links and having pivotal connections to the ends of said seat cushion adjacent the rear edge thereof to support the rear edge of the seat cushion in elevated position in the upright position of said second links, extending arms on the ends of said second links connected to said back cushion above the vertical center thereof to support the top of the back cushion above and behind the erected position of said seat cushion, third links pivoted on said floor by pivots, said third links being swingable in vertical planes alongside of said seat and being connected at their swinging ends to the ends of said back cushion at the lower edge thereof, the length of said third links being such as to support the back surface of said back cushion at the level of said support in the forwardly rotated and upright positions of said third links, a deck panel on the back of said back cushion, a filler deck panel hinged at its lower edge to the lower edge of said extension panel and in facing relation thereto in the erected position of said back cushion, fixed pivots located below and rearwardly of said support, fourth links of upwardly concave shape connected at their rear ends to said fixed pivots to swing upwardly around the forward edge of said support and pivotally connected at their swinging ends to said filler deck panel adjacent the upper rear edge thereof, said support being engageable with the rear edge of said filler deck panel in the downwardly folded position of the filler deck panel, coacting stud and socket means having cushioning surfaces and interlockingly engageable longitudinally of the vehicle between a fixed point on said vehicle and said filler deck panel when said panel is horizontal, and a stop on a fixed part of said vehicle supporting the upper portion of the back of said back cushion in the erected position of said back cushion.

5. A folding seat structure in a vehicle having a floor and a support positioned in elevated position behind said floor comprising a seat cushion, a back cushion, first links pivoted on said floor and swingable in vertical planes at each side of said seat, said first links being connected to the ends of said seat cushion adjacent the front edge thereof to support the front of the seat cushion in elevated erected position when the links are upright, second links pivoted on said floor behind said first links and having pivotal connections to the ends of said seat cushion adjacent the rear edge thereof to support the rear edge of the seat cushion in elevated position in the upright position of said second links, extending arms on the ends of said second links connected to said back cushion above the vertical center thereof to support the top of the back cushion above and behind the erected position of said seat cushion, third links pivoted on said floor by pivots, said third links being swingable in vertical planes alongside of said seat and being connected at their swinging ends to the ends of said back cushion at the lower edge thereof to support the back surface of said back cushion forwardly of said support in the forwardly rotated and upright positions of said third links, a deck panel on the back of said back cushion, a filler deck panel hinged at its lower edge to the lower edge of said extension panel and in facing relation thereto in the erected position of said back cushion, fixed pivots located rearwardly of said support, fourth links connected at their rear ends to said fixed pivots to swing upwardly and pivotally connected at their swinging ends to said filler deck panel adjacent the upper rear edge thereof, said support being engageable with the rear edge of said filler deck panel in the downwardly folded position of the filler deck panel, coacting stud and socket means having cushioning surfaces and interlockingly engageable longitudinally of the vehicle between a fixed point on said vehicle and said filler deck panel when said panel is horizontal, and a stop on a fixed part of said vehicle supporting the upper portion of the back of said back cushion in the erected position of said back cushion.

6. A folding seat structure in a vehicle having a floor and a deck positioned in elevated position behind said floor comprising a seat cushion, a back cushion, first link means pivoted on said floor and swingable in vertical longitudinal planes, said first links being connected to said seat cushion adjacent the front edge thereof to support the front of the seat cushion in elevated position when the links are upright, second links pivoted on said floor behind said first links and having pivotal connections to said seat cushion adjacent the rear edge thereof to support the rear edge of the seat cushion in elevated position in the upright position of said second links, lever means connected to said second links to swing therewith and connected to the ends of said back cushion substantially above the bottom thereof to support the top of the back cushion above and behind the erected position of said seat cushion, third links pivoted on said floor by brackets raising their pivots above the pivotal connections at the lower ends of said second links and located ahead of said second links, said third links being swingable in vertical longitudinal planes of said vehicle and being connected at their swinging ends to the ends of said back cushion at the lower edge thereof, the length of said third links being such as to support the back surface of said back cushion at the level of said deck in the forwardly rotated and upright positions of said third links, a deck extension panel on the back of said back cushion, a filler deck panel hinged at its lower edge to the lower edge of said extension panel and in facing relation thereto in the erected position of said back cushion, brackets secured to the underside of said deck, fixed pivots on said brackets located below and rearwardly of the forward edge of said deck, fourth links of upwardly concave shape connected at their rear ends to said fixed pivots to swing upwardly around the forward edge of said deck and pivotally connected at their swinging ends to the underside of said filler deck panel adjacent the upper rear edge thereof, a fixed support engageable with the rear edge of said filler deck panel in the downwardly folded position of the filler deck panel, coacting stud and socket means having cushioning surfaces and interlockingly engageable longitudinally of the vehicle between a fixed point on said vehicle and said filler deck panel when said panel is horizontal, and a stop on a fixed part of said vehicle longitudinally supporting the upper portion of the back of said back cushion in the erected position of said back cushion.

7. A folding seat structure in a vehicle having a floor and a deck positioned in elevated position behind said floor comprising a seat cushion, a back cushion, first link means pivoted on said floor and swingable in vertical longitudinal planes, said first links being connected to said seat cushion adjacent the front edge thereof to support the front of the seat cushion in elevated position when the links are upright, second links pivoted on said floor behind said first links and having pivotal connections to said seat cushion adjacent the rear edge thereof to support the rear edge of the seat cushion in elevated position in the upright position of said second links, lever means connected to said second links to swing therewith and connected to the ends of said back cushion substantially above the bottom thereof to support the top of the back cushion above and behind the erected position of said seat cushion, third links pivoted on said floor, said third links being swingable in vertical longitudinal planes of said vehicle and being connected at their swinging ends to the ends of said back cushion at the lower edge thereof to support the back surface of said back cushion in the forwardly rotated and upright positions of said third links, a deck extension panel on the back of said back cushion, a filler deck panel hinged at its lower edge to the lower edge of said extension panel and in facing relation thereto in the erected position of said back cushion, brackets secured to the underside of said deck, fixed pivots on said brackets located below and rearwardly of the forward edge of said deck, fourth links of upwardly concave shape connected at their rear ends to said fixed pivots to swing upwardly around the forward edge of said deck and pivotally connected at their swinging ends to the underside of said filler deck panel adjacent the upper rear edge thereof, a fixed support engageable with the rear edge of said filler deck panel in the downwardly folded position of the filler panel, and a stop on a fixed part of said vehicle longitudinally supporting the upper portion of the back of said back cushion in the erected position of said back cushion.

8. A folding seat structure in a vehicle having a floor and a deck positioned in elevated position behind said floor comprising a seat cushion, a back cushion, first links pivoted on said floor and swingable in vertical longitudinal planes, said first links being connected to said seat cushion adjacent the front edge thereof to support the front of the seat cushion in elevated erected position when the links are upright, second links pivoted on said floor behind said first links and having pivotal connections to said seat cushion adjacent the rear edge thereof to support the rear edge of the seat cushion in the upright position of said second links, lever means connected to said second links to swing in fixed angular relation therewith and connected to said back cushion substantially above the bottom thereof to support the top of the back cushion above and behind the erected position of said seat cushion, third links pivoted on said floor, said third links being swingable in vertical longitudinal planes of said vehicle and being connected at their swinging ends to said back cushion at the lower edge thereof, the length of said third links being such as to support the back surface of said back cushion at the level of said deck in the forwardly rotated and upright positions of said third links, a deck extension panel on the back of said back cushion, a filler deck panel hinged at its lower edge to the lower edge of said extension panel and in facing relation thereto in the erected position of said back cushion, fixed pivots located rearwardly of the erected position of said back cushion, fourth links connected at their rear ends to said fixed pivots to swing upwardly and pivotally connected at their swinging ends to the rear edge of said filler deck panel, a fixed support engageable with the rear edge of said filler deck panel in the downwardly folded position of the filler deck panel, and a stop on a fixed part of said vehicle longitudinally supporting the upper portion of the back of said back cushion in the erected position of said back cushion.

9. A folding seat structure in a vehicle having a floor and a deck positioned in elevated position behind said floor comprising a seat cushion, a back cushion, first links pivoted on said floor and swingable in vertical longitudinal planes, said first links being connected to said seat cushion adjacent the front edge thereof to support the front of the seat cushion in elevated erected position when the links are upright, second links pivoted on said floor behind said first links and having pivotal connections to said seat cushion adjacent the rear edge thereof to support the rear edge of the seat cushion in the upright position of said second links, lever means connected as a rigid extension to said second links to swing therewith and connected to said back cushion substantially above the bottom thereof to support the top of the back cushion above and behind the erected position of said seat cushion, third links pivoted on said floor, said third links being swingable in vertical longitudinal planes of said vehicle and being connected at their swinging ends to said back cushion at the lower edge thereof to support the back surface of said back cushion in the forwardly rotated and upright positions of said third links, a deck extension panel on the back of said back cushion, a filler deck panel hinged at its lower edge to the lower edge of said extension panel and in facing relation thereto in the erected position of said back cushion, fixed pivots located rearwardly of the erected position of said back cushion, means connecting said fixed pivots to said filler deck panel to guide the rear edge of the filler panel in an upwardly and rearwardly then downwardly and forwardly directed arc, a fixed support engageable with the rear edge of said filler deck panel in the downwardly folded position of the filler deck panel, and a stop on a fixed part of said vehicle longitudinally supporting the upper portion of the back of said back cushion in the erected position of said back cushion.

10. A folding seat in a vehicle having a floor comprising a seat cushion, a back cushion, first link means pivoted on said floor and supporting the corners of said seat cushion in an elevated and rearwardly located position in the upright position of the link means and swingable forwardly to lower said seat cushion, extended arms on the rearmost of said link means inclined upwardly and rearwardly from the upright position of the link means and pivotally connected to the ends of said back cushion above the bottom of the back cushion, second link means pivotally connected to the bottom of said back cushion and to fixed points located forwardly of the rear edge of said seat cushion in the erected position of the seat cushion, a deck panel on the back of said seat cushion, a filler deck panel hingedly connected at its lower edge to the lower edge of said first deck panel in opposed facing relation thereto in the erected position of said back cushion, means connected between fixed points behind said back cushion and the swinging side of said filler deck panel swingably guiding the swinging edge of said filler deck panel as said back cushion swings on said second link means, and a fixed support on said vehicle behind said back cushion vertically engageable with the swinging edge of said filler deck panel in the forwardly folded position of said back cushion.

11. A folding seat in a vehicle having a floor comprising a seat cushion, a back cushion, first link means pivoted on said floor and supporting the corners of said seat cushion in an elevated and rearwardly located position in the upright position of the link means and swingable forwardly to lower said seat cushion, levers connected to said link means and pivotally connected to the ends of said back cushion above the bottom of the back cushion, second link means pivotally connected to the bottom of said back cushion and to fixed points located forwardly of the rear edge of said seat cushion in the erected position of the seat cushion, a deck panel on the back of said seat cushion, a filler deck panel hingedly connected at its lower edge to the lower edge of said first deck panel in opposed facing relation thereto in the erected position of said back cushion, means connected between fixed points behind said back cushion and the swinging side of said filler deck panel swingably guiding the swinging edge of said filler deck panel as said back cushion swings on said second link means, and a fixed support on said vehicle behind said back cushion vertically engageable with the swinging edge of said filler deck panel in the forwardly folded position of said back cushion.

12. A folding seat in a vehicle having a floor comprising a seat cushion, a back cushion, first link means pivoted on said floor and supporting the corners of said seat cushion in an elevated and rearwardly located posion in the upright position of the link means and swingable forwardly to lower said seat cushion, rigidly extended arms on the rearmost of said link means inclined upwardly and rearwardly from the upright position of the link means and pivotally connected to said back cushion above the bottom of the back cushion, second link means pivotally connected to the bottom of said back cushion and to fixed points located forwardly of the rear edge of said seat cushion in the erected position of the seat cushion, a deck panel on the back of said seat cushion, a filler deck panel hingedly connected at its lower edge to the lower edge of said first deck panel in opposed facing relation thereto in the erected position of said back cushion, means including third links pivotally connected between fixed points behind said back cushion and the swinging side of said filler deck panel swingably guiding the swinging edge of said filler deck panel as said back cushion swings on said second link means, and a fixed support on said vehicle behind said back cushion vertically engageable with the swinging edge of said filler deck panel at the level of said first deck panel in the forwardly folded position of said back cushion.

13. A folding seat in a vehicle having a floor comprising a seat cushion, a back cushion, first link means pivoted on said floor and supporting the corners of said seat cushion in an elevated and rearwardly located position in the upright position of the link means and swingable forwardly to lower said seat cushion, extended arms on the rearmost of said link means and inclined upwardly and rearwardly from the upright position of the link means and pivotally connected to said back cushion substantially above the bottom of the back cushion, second link means pivotally connected to the bottom of said back cushion and to fixed points located forwardly of the rear edge of said seat cushion in the erected position of seat cushion, a deck panel on the back of said seat cushion, a filler deck panel hingedly connected at its lower edge to the lower edge of said first deck panel in opposed facing relation thereto in the erected position of said back cushion, means including fixed pins on said vehicle behind said back cushion and slotted plates on the swinging sides of said filler deck panel engaged with the pins through the slots for swingably guiding the swinging edge of said filler deck panel as said back cushion swings on said second link means, and a fixed support on said vehicle behind said back cushion vertically engageable with the swinging edge of said filler deck panel at the level of said first deck panel in the forwardly folded position of said back cushion.

14. A folding seat in a vehicle having a floor comprising a seat cushion, a back cushion, first link means pivoted on said floor and supporting the corners of said seat cushion in an elevated and rearwardly located position in the upright position of the link means and swingable forwardly to lower said seat cushion, levers connected to said link means and inclined upwardly and rearwardly from the upright position of the link means and pivotally connected to said back cushion substantially above the bottom of the back cushion, second link means pivotally connected to the bottom of said back cushion and to fixed points, a deck panel on the back of said seat cushion, a filler deck panel hingedly connected at its lower edge to the lower edge of said first deck panel in opposed facing relation thereto in the erected position of said back cushion, and means including fixed pins on said vehicle behind said back cushion and slotted plates on the swinging sides of said filler deck panel engaged with the pins through the slots for swingably guiding the swinging edge of said filler deck panel as said back cushion swings on said second link means.

References Cited in the file of this patent

UNITED STATES PATENTS

| | | |
|---|---|---|
| 2,152,505 | Stuart et al. | Mar. 28, 1939 |
| 2,926,951 | Koplin | Mar. 1, 1960 |
| 2,927,818 | Ferrara | Mar. 8, 1960 |

FOREIGN PATENTS

| | | |
|---|---|---|
| 694,578 | Germany | Aug. 3, 1940 |
| 345,908 | Great Britain | Apr. 2, 1931 |